United States Patent
Chen et al.

(10) Patent No.: US 8,490,757 B2
(45) Date of Patent: Jul. 23, 2013

(54) STROLLER AND BRAKE MECHANISM THEREOF

(75) Inventors: Ruibin Chen, Guangdong (CN); Zong-Wang Cui, Guangdong (CN)

(73) Assignee: Wonderland Nurserygoods Company Limited, Central (HK)

( * ) Notice: Subject to any disclaimer, the term of this patent is extended or adjusted under 35 U.S.C. 154(b) by 263 days.

(21) Appl. No.: 13/187,496

(22) Filed: Jul. 20, 2011

(65) Prior Publication Data

US 2012/0031714 A1   Feb. 9, 2012

(30) Foreign Application Priority Data

Aug. 3, 2010 (CN) .......................... 2010 1 0249773

(51) Int. Cl.
*B62B 9/08* (2006.01)
(52) U.S. Cl.
USPC .................................. 188/20; 188/29; 188/31
(58) Field of Classification Search
USPC .......................... 188/19, 20, 1.12, 2 F, 29, 31
See application file for complete search history.

(56) References Cited

U.S. PATENT DOCUMENTS

| 6,264,007 | B1 * | 7/2001 | Norton et al. .................. 188/2 F |
| 8,316,999 | B2 * | 11/2012 | Solinski et al. ................. 188/20 |
| 2007/0051565 | A1 | 3/2007 | Chen |

FOREIGN PATENT DOCUMENTS

| CN | 201214442 Y | 4/2009 |
| CN | 201258004 Y | 6/2009 |
| CN | 201777285 U | 3/2011 |
| EP | 2 289 763 A2 | 3/2011 |
| TW | M325259 U | 1/2008 |

* cited by examiner

*Primary Examiner* — Melanie Torres Williams
(74) *Attorney, Agent, or Firm* — Winston Hsu; Scott Margo (57) ABSTRACT

A brake mechanism for a stroller includes an axle, a wheel and at least one brake fixing seat disposed at an inner side of the wheel. The brake fixing seat includes a brake assembly and a fixing seat. The brake assembly includes a pedal assembly and a brake member. The brake member has at least one abutting portion and at least one brake arm. The brake assembly includes a pushing member for pushing the abutting portion. A brake hub is disposed at the inner side of the wheel. A plurality of recesses is formed on the brake hub and arranged compactly. The axle passes through the pedal assembly, the brake member, and the fixing seat. The pedal assembly is used to drive the pushing member to push the abutting portion and the brake member moves toward the brake hub until the brake arm extends into the recesses.

22 Claims, 14 Drawing Sheets

STROLLER AND BRAKE MECHANISM THEREOF

BACKGROUND OF THE INVENTION

1. Field of the Invention

The invention relates to a brake mechanism and, more particularly, to a brake mechanism for a stroller and a stroller equipped with the brake mechanism.

2. Description of the Prior Art

To ensure driving security, most of conventional strollers are equipped with brake mechanism. For a conventional brake mechanism, a brake member, which is fixed on a wheel seat, is inserted into a hole/recess, which is formed on a brake hub of a wheel, so as to achieve brake function.

A conventional brake mechanism comprises a wheel below a frame, a fixing member disposed on the wheel, and a rod member disposed on the frame. A brake hole/recess is formed on the fixing member and a brake member is pivotally disposed on the rod member. The brake member can be operated between a brake position and a release position. When the brake member is situated at the brake position, the brake member is located in the brake hole/recess. When the brake member is situated at the release position, the brake member is separated from the brake hole/recess. The simultaneous operation between the brake position and the release position can be achieved by a cable connected to the brake members of two sides, an operating member connected to the cable and disposed on the frame, and a spring disposed between the brake member and the rod member.

The aforesaid brake mechanism utilizes the operating member and the cable to drive the brake member to brake the stroller and utilizes the spring to provide an elastic force for returning the brake member. However, to overcome the elastic force of the spring, a user usually has to operate the operating member with an extra force when braking the stroller. It is strenuous for the user. Furthermore, the spring will become fragile after multiple operations and then the deformed spring will lose function and has to be replaced accordingly. In other words, the conventional brake mechanism has relative short service life and low reliability.

Therefore, it is necessary to provide a brake mechanism for a stroller with simple structure, convenient operation, and high reliability.

SUMMARY OF THE INVENTION

An objective of the invention is to provide a brake mechanism for a stroller with simple structure, convenient operation, and high reliability.

To achieve the aforesaid objective, a brake mechanism of the invention for a stroller comprises an axle, a wheel and at least one brake fixing seat disposed at an inner side of the wheel. The brake fixing seat comprises a brake assembly and a fixing seat. The brake assembly comprises a pedal assembly and a brake member. The brake member has at least one abutting portion and at least one brake arm. The brake assembly further comprises a pushing member for urging the abutting portion. A brake hub is disposed at the inner side of the wheel. A plurality of recesses is formed on the brake hub and is arranged compactly. The axle passes through the pedal assembly, the brake member and the fixing seat sequentially. The pedal assembly is used to drive the pushing member to push the abutting portion, such that the brake member moves toward the brake hub until the brake arm extends into the recesses, so as to brake the stroller. The brake mechanism has advantages of simple structure, convenient operation, and high reliability.

Preferably, the pedal assembly comprises a pedal and a first hub connected to the pedal, and the brake member is movably disposed in the first hub.

In a preferred embodiment, the brake assembly further comprises a driving member disposed in the first hub, and the driving member comprises a base plate with a shaft formed on a center of the base plate, at least one recess portion is formed on a side of the base plate relative to the shaft, and the pushing member extending from the recess portion.

Preferably, the pushing member is strip-shaped, the pushing member comprises a tilt portion and a horizontal portion, the tilt portion is connected to the recess portion, the horizontal portion is a free end of the pushing member, and the horizontal portion and the base plate are separate.

Preferably, the brake member comprises a central ring and two protruding arms protruding from opposite sides of the central ring, two brake arms are connected to the two protruding arms respectively, and the abutting portion protrudes from a side of the brake arm.

Preferably, the pushing member of the driving member is located between the abutting portion and the protruding arm, the tilt portion drives the brake member moves toward the wheel when the pedal drives the driving member to rotate, and the brake arm extends into the recesses when the horizontal portion abuts against the abutting portion.

In another preferred embodiment, the pushing member is disposed in the first hub, and the pushing member and the first hub are formed integrally.

Preferably, a central hole is formed on the abutting portion of the brake member, and the brake arm protrudes from the abutting portion.

Preferably, a slot is formed on the abutting portion, and the pushing member passes through the slot and pushes the abutting portion.

Preferably, an inner side of the slot has a guiding inclined surface, and the guiding inclined surface contacts the pushing member so as to guide the brake member to move toward the brake hub.

The brake assembly further comprises a spring, one end of the spring abuts against the fixing seat and another end of the spring abuts against the abutting portion.

A stroller of the invention comprises at lest one brake mechanism. The brake mechanism comprises an axle, a wheel and at least one brake fixing seat disposed at an inner side of the wheel. The brake fixing seat comprises a brake assembly and a fixing seat. The brake assembly comprises a pedal assembly and a brake member. The brake member has at least one abutting portion and at least one brake arm. The brake assembly further comprises a pushing member for pushing the abutting portion. A brake hub is disposed at the inner side of the wheel. A plurality of recesses is formed on the brake hub and is arranged compactly. The axle passes through the pedal assembly, the brake member, the fixing seat and the brake hub sequentially. The pedal assembly is used to drive the pushing member to push the abutting portion, such that the brake member moves toward the brake hub until the brake arm extends into the recesses, so as to brake the stroller.

These and other objectives of the present invention will no doubt become obvious to those of ordinary skill in the art after reading the following detailed description of the preferred embodiment that is illustrated in the various figures and drawings.

DETAILED DESCRIPTION

The following detailed description of the preferred embodiments is illustrated in the various figures and drawings, and the invention is not limited to these embodiments.

Figure 1:
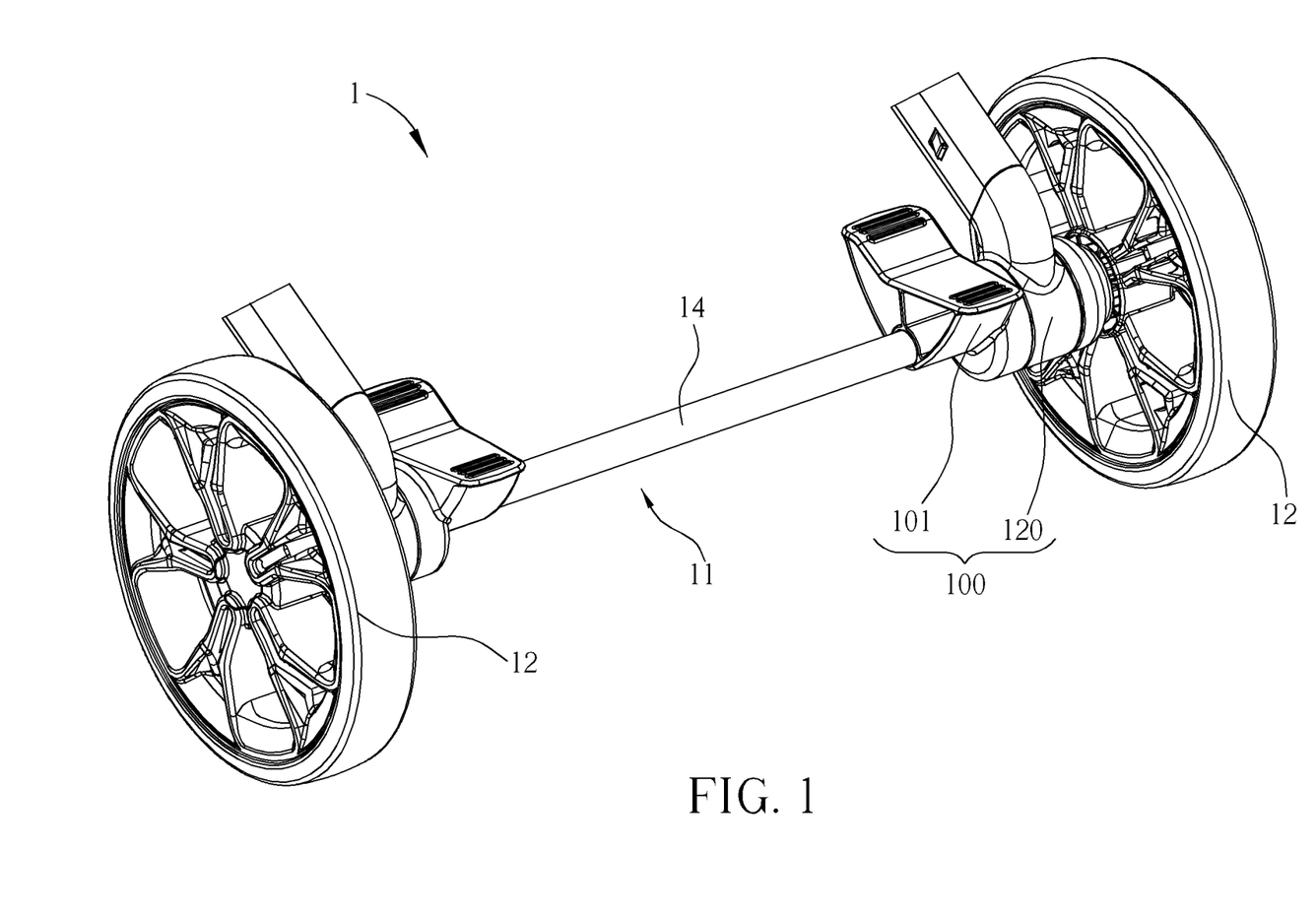
FIG. 1 is a perspective view illustrating a brake mechanism according to a first embodiment of the invention.
Figure 2A:
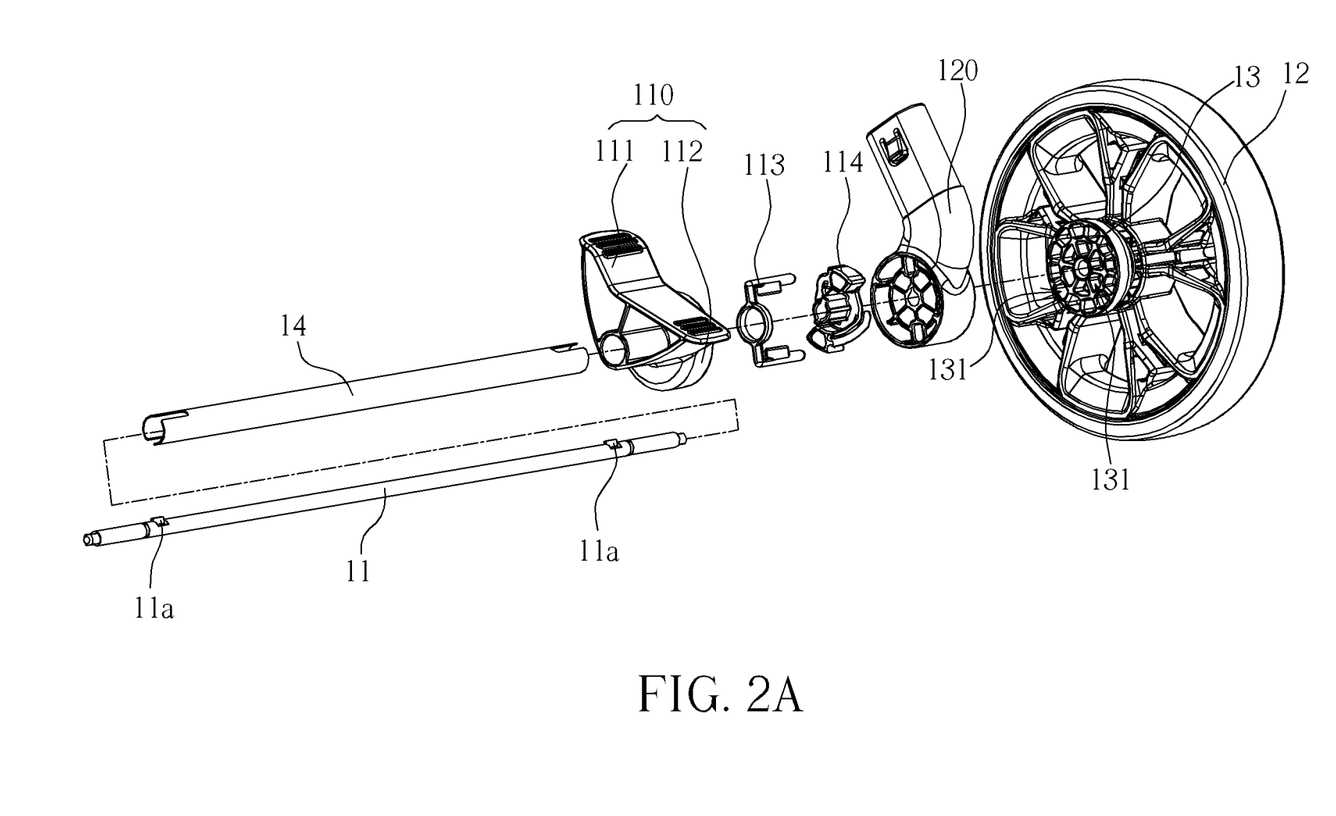
FIG. 2A is an exploded view illustrating parts of the brake mechanism shown in FIG. 1 in a specific view angle.
Figure 2B:
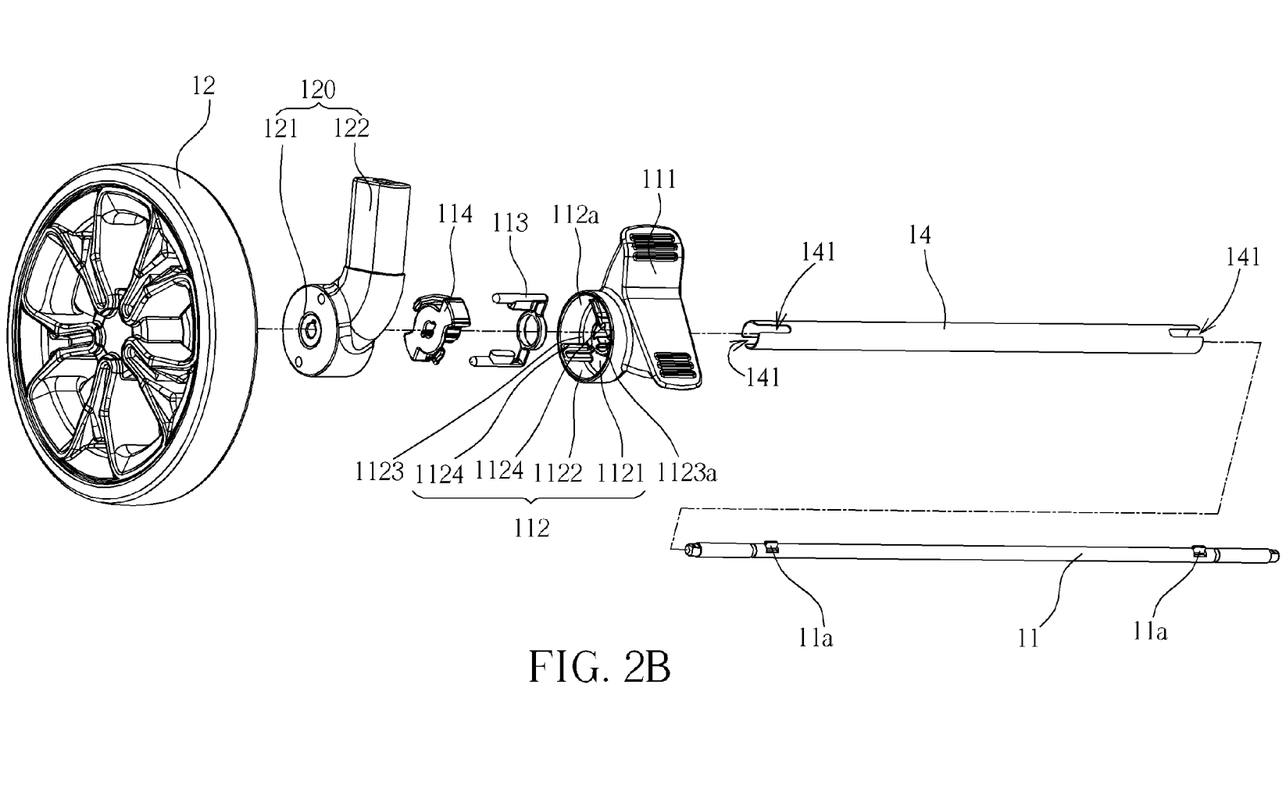
FIG. 2B is an exploded view illustrating parts of the brake mechanism shown in FIG. 1 in another specific view angle.

Referring to FIGS. 1 to 2B, the brake mechanism 1 of the invention for a stroller according to a first embodiment comprises an axle 11, two wheels 12, a linking tube 14 and at least one brake fixing seat 100, wherein the axle 11 is disposed in the linking tube 14 and the brake fixing seat 100 is disposed at an inner side of the wheel 12 and on the axle 11. In this invention, two brake fixing seats 100 are disposed at the inner side of the two wheels 12 respectively. Since the structures of the two brake fixing seats 100 are the same with each other, only one of the brake fixing seats 100 is described in the following.

Figure 3:
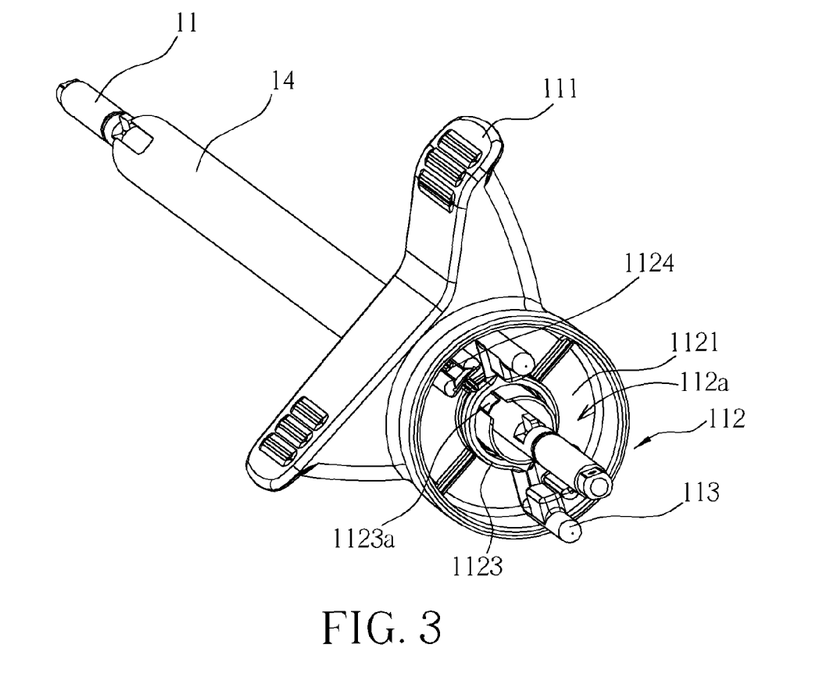
FIG. 3 is a schematic diagram illustrating the structure of parts of the brake assembly of the brake mechanism shown in FIG. 2.

As shown in FIGS. 1 to 3, the brake fixing seat 100 comprises a brake assembly 101 and a fixing seat 120 connected to the brake assembly 101. After assembling the brake fixing seat 100, the fixing seat 120 is located between the brake assembly 101 and the wheel 12. A brake hub 13 is disposed at the inner side of the wheel 12. A plurality of recesses 131 is formed on the brake hub 13 and is arranged compactly. The brake assembly 101 comprises a pedal assembly 110, a brake member 113 movably connected to the pedal assembly 110, and a driving member 114 for driving the brake member 113. The pedal assembly 110 comprises a pedal 111 and a first hub 112 connected to the pedal 111. The pedal 111 and the first hub 112 are formed integrally. One side of first hub 112 facing the fixing seat 120 is open, and the opposite side has a first bottom wall 1121 and a first side wall 1122 surrounding the first bottom wall 1121 so as to form an accommodating space 112a. The brake member 113 is movably disposed in the first hub 112. A central shaft 1123 is formed on a center of the first bottom wall 1121. The central shaft 1123 is sleeve-shaped and the axle 11 can pass through the central shaft 1123. At least one active protrusion is formed in the central shaft 1123. Preferably, in this embodiment, a pair of active protrusions 1123a are formed symmetrically and used for engaging with open grooves 141 of the linking tube 14, such that the pedal 111 can drive the linking tube 14. Preferably, two protruding blocks 1124 are disposed on the first bottom wall 1121, wherein the two protruding blocks 1124 and the central shaft 1123 are aligned with each other.

Figure 4:
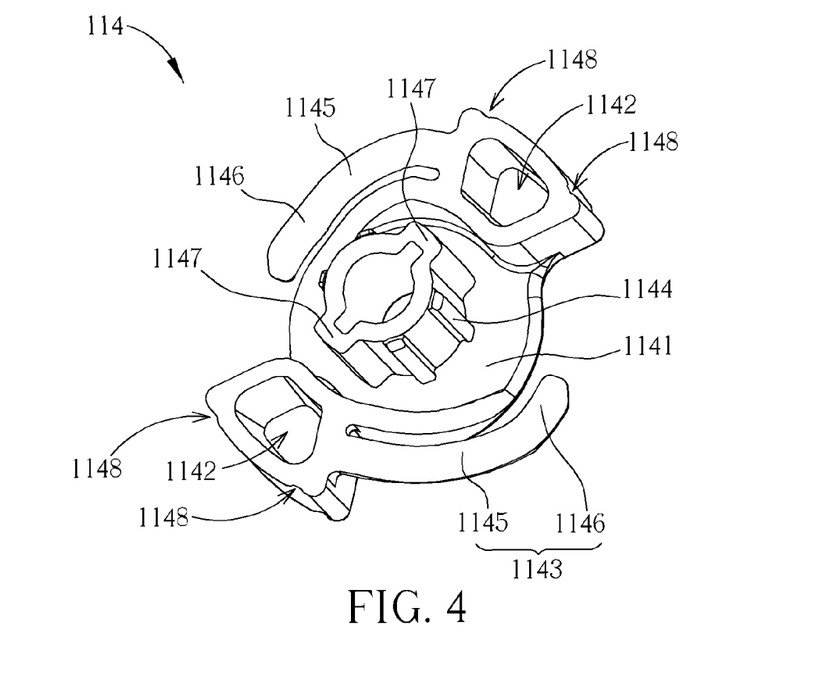
FIG. 4 is a schematic diagram illustrating the structure of the driving member of the brake mechanism shown in FIG. 2.

The driving member 114 of this embodiment is illustrated in FIG. 4. The driving member 114 is disposed in the accommodating space 112a of the first hub 112 and is assembled with the brake member 113. The driving member 114 comprises a base plate 1141, two recess portions 1142 formed on opposite sides of the base plate 1141 relative to the shaft 1144 symmetrically, and a pushing member 1143 extending from each of the recess portions 1142. When the driving member 114 is disposed in the accommodating space 112a of the first hub 112 of the brake assembly 101, the two recess portions 1142 are engaged with the two protruding blocks 1124 on the first bottom wall 1121 of the first hub 112, such that the pedal 111 can drive the driving member 114 to move. A shaft 1144 is formed on a center of the base plate 1141. The shaft 1144 is sleeve-shaped and the axle 11 can be inserted into the shaft 1144.

Preferably, at least one passive protrusion is disposed on an outer wall of the sleeve-shaped shaft 1144. In this embodiment, two passive protrusions 1147 are formed on the shaft 1144 symmetrically and used for engaging with the open grooves 141 of the linking tube 14, such that the driving member 114 can be driven by the linking tube 14.

Figure 5:
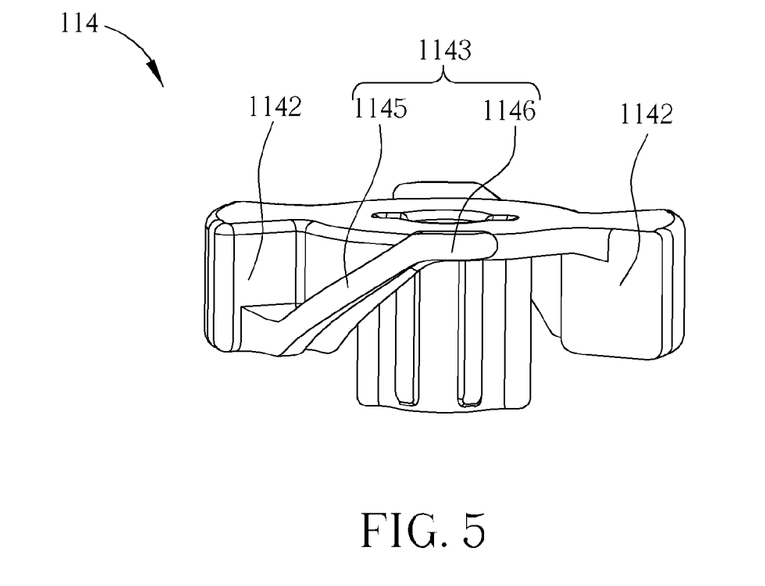
FIG. 5 is a side view illustrating the driving member shown in FIG. 4.

As shown in FIG. 4, each of the two pushing members 1143 of this embodiment is strip-shaped. Preferably, each of the two pushing members 1143 is resilient member and extends from the recess portion 1142 symmetrically. The pushing member 1143 has a tilt portion 1145 and a horizontal portion 1146, wherein the tilt portion 1145 is connected to the recess portion 1142 and the horizontal portion 1146 is a free end of the pushing member 1143. A gap exists between the horizontal portion 1146 and the base plate 1141 to keep them separate. A gradient is formed from the tilt portion 1145 to the horizontal portion 1146. When the driving member 114 is assembled with the first hub 112, the horizontal portion 1146 is higher than the tilt portion 1145 relative to the first hub 112. In other words, a height difference exists between the horizontal portion 1146 and the tilt portion 1145, as shown in FIG. 5.

Figure 6:
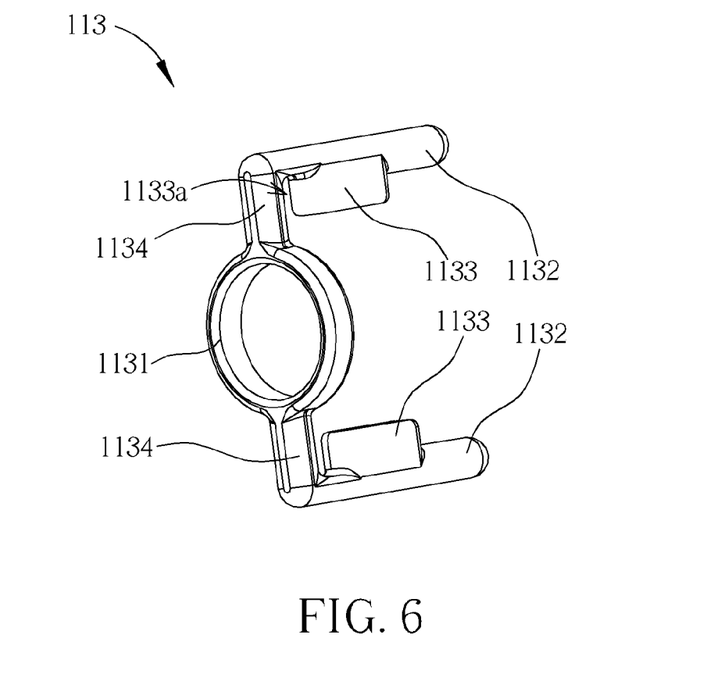
FIG. 6 is a schematic diagram illustrating the structure of the brake member of the brake mechanism shown in FIG. 2.

FIG. 6 illustrates the structure of the brake member 113 of this embodiment. As shown in FIG. 6, the brake member 113 comprises a central ring 1131, two protruding arms 1134 protruding from opposite sides of the central ring 1131 symmetrically, and two brake arms 1132 connected to the protruding arms 1134 respectively. In this invention, the number of the brake arms may be one or more than one and preferably may be, but not limited to, two. There is an abutting portion 1133 disposed on the brake arm 1132. The abutting portion 1133 protrudes from a side of the brake arm 1132, and preferably the two abutting portions face each other. The pushing member 1143 of the driving member 114 passes through a gap 1133a between a bottom end of the abutting portion 1133 and the protruding arm 1134. Part of the brake member 113 is disposed in the accommodating space 112a of the first hub 112, the axle 11 and the linking tube 14 can pass through the central ring 1131, and the brake arm 1132 extends from the first hub 112 to the fixing seat 120.

Figure 7A:
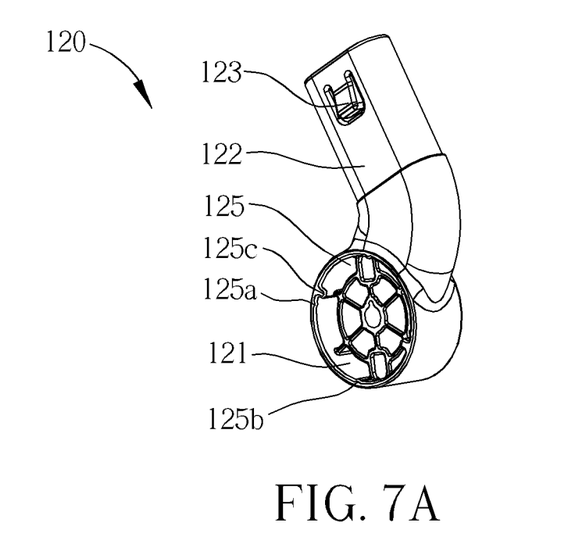
FIG. 7A is a perspective view illustrating the fixing seat of the brake mechanism shown in FIG. 2.
Figure 7B:
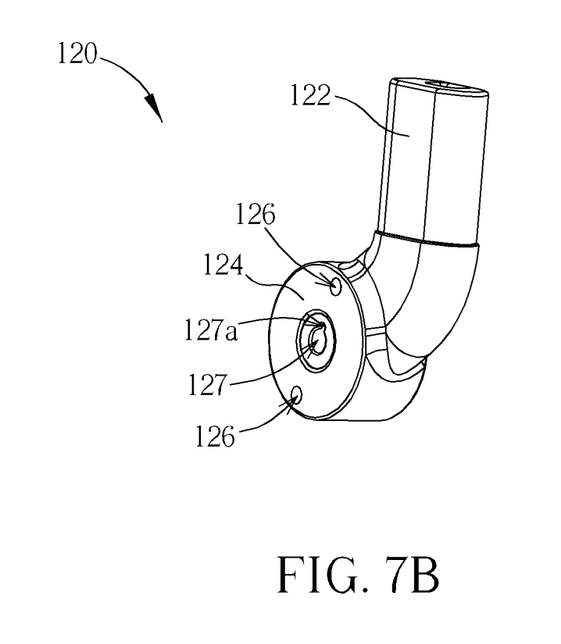
FIG. 7B is another perspective view illustrating the fixing seat shown in FIG. 7A.

FIGS. 7A and 7B are perspective views illustrating the fixing seat 120 of the brake mechanism 1. As shown in FIGS. 7A and 7B, the fixing seat 120 comprises a second hub 121 and a first extending tube 122, wherein the second hub 121 can be disposed on the axle 11 and the first extending tube 122 can be connected to a rear leg tube of a frame of a stroller (not shown). Preferably, a resilient buckle 123 is disposed on the first extending tube 122 and an open groove (not shown) can be formed on the rear leg tube of the frame of the stroller, such that the resilient buckle 123 can be engaged with the open groove. Accordingly, the connection will be simple and stable. In this embodiment, the second hub 121 has a second bottom wall 124 and a second side wall 125 surrounding the second bottom wall 124. An opening 127 is formed on a center of the second bottom wall 124 and the axle 11 can pass through the opening 127. Preferably, a recess 127a is formed on an edge of the opening 127 and a protruding block 11a of the axle 11 can be engaged with the recess 127a, so as to prevent the axle 11 from separating from the fixing seat 120. A hole 126 is formed on the second bottom wall 124 and corresponding to the brake arm 1132, and the brake arm 1132 can pass through the hole 126.

Furthermore, as shown in FIGS. 4 and 7A, two grooves 1148 are formed on an outer surface of the recess portion 1142 of the driving member 114, and two positioning ribs 125a, 125b are preferably disposed on the second side wall 125 of the second hub 121 of the fixing seat 120. When the pedal 111 is situated at the brake position or the release position, the positioning ribs 125a, 125b are engaged with the grooves 1148 of the driving member 114 so as to fix the driving member 114. Moreover, a block rib 125c is preferably disposed on the second side wall 125. The block rib 125c can cooperate with the brake arm 1132 to restrain the driving member 114 from rotating with respect to the fixing seat 120 within a specific range. The number of the positioning ribs 125a, 125b and the block rib 125c may be one or more than one. In this embodiment, there are two sets of positioning ribs 125a, 125b and block rib 125c disposed symmetrically with respect to the opening 127.

Figure 8A:
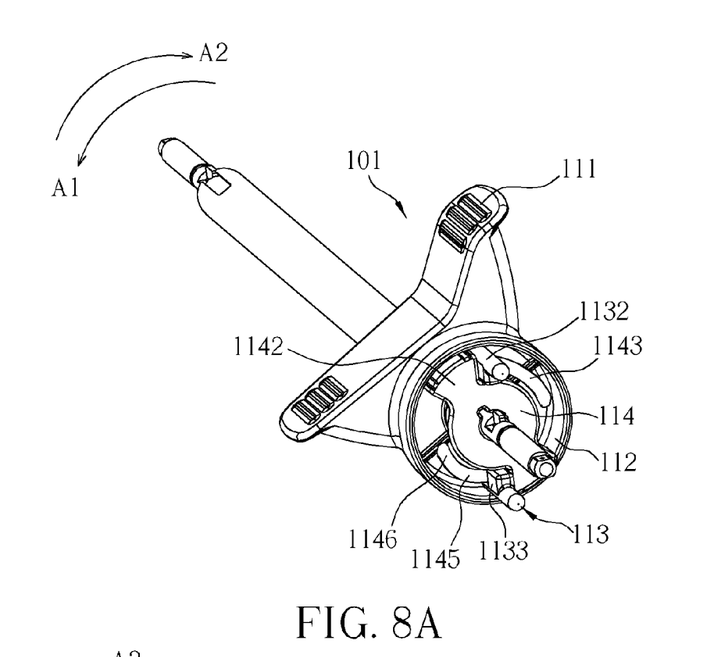
FIG. 8A is an assembly diagram illustrating the brake member of the brake mechanism shown in FIG. 2.

FIG. 8A is an assembly diagram illustrating the brake member 113 and the driving member 114 of the brake assembly 101. As shown in FIG. 8A, when assembling the brake member 113 and the driving member 114, the pushing member 1143 of the driving member 114 is disposed in the gap 1133a between the abutting portion 1133 and the protruding arm 1134, and the shaft 1144 and the central ring 1131 are aligned with each other. Afterward, the brake member 113 and the driving member 114 are disposed in the accommodating space 112a of the first hub 112 at the same time, and the recess portion 1142 of the driving member 114 is aligned and engaged with the protruding block 1124 of the first hub 112. At this time, as shown in FIG. 8A, the abutting portion 1133 of the brake arm 1132 abuts against the tilt portion 1145 of the pushing member 1143 of the driving member 114. Since the pushing member 1143 is resilient, the abutting portion 1133 will abut against the pushing member 1143 tightly. Accordingly, the brake function will be more sensitive.

Figure 8B:
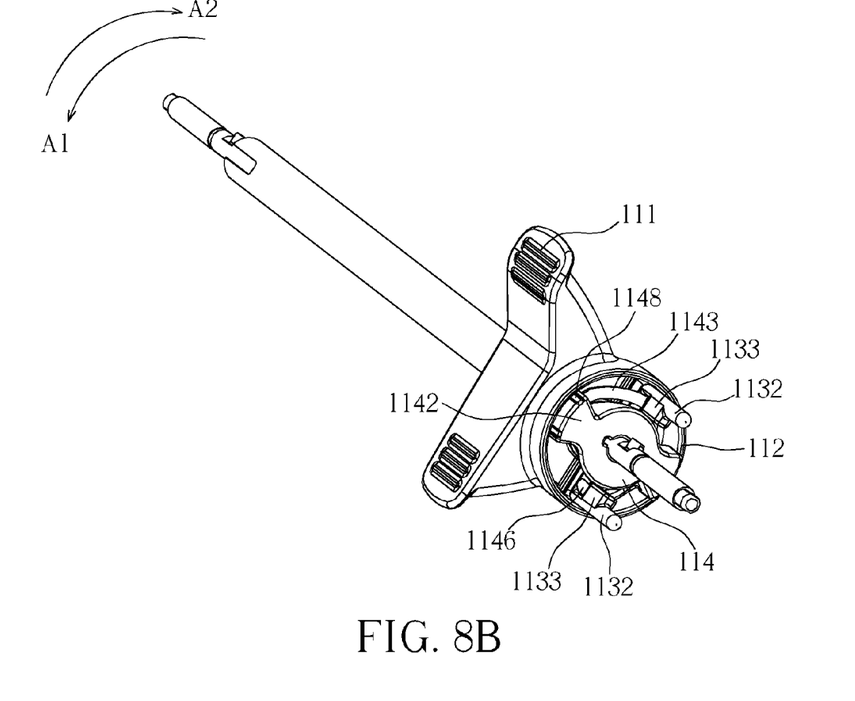
FIG. 8B is a schematic diagram illustrating the brake assembly shown in FIG. 8A under brake state.
Figure 8C:
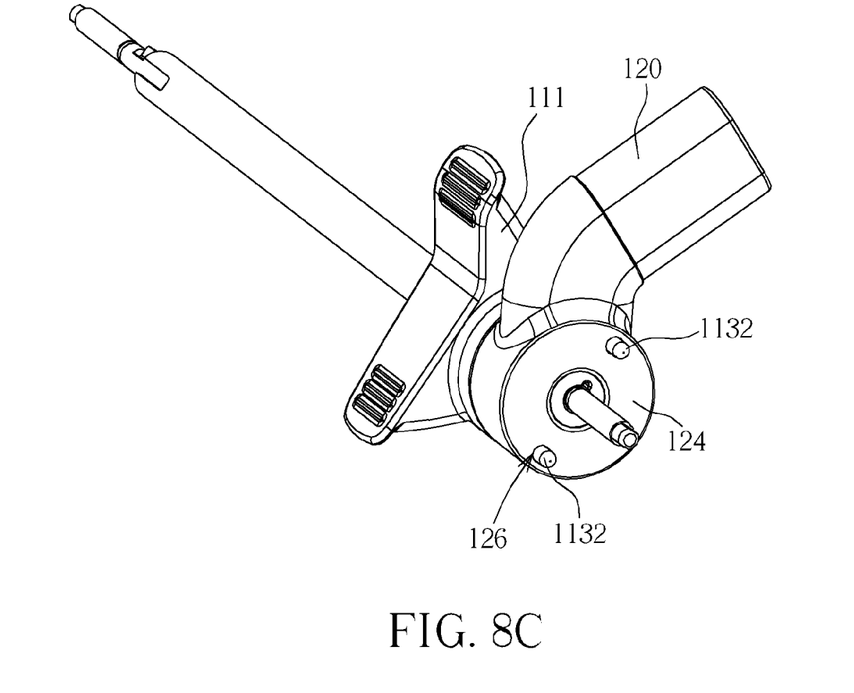
FIG. 8C is a schematic diagram illustrating the brake assembly and the fixing seat under brake state.

As shown in FIG. 8B, when a user steps on the pedal 111, the first hub 112 will rotate along with the pedal 111. Since the protruding block 1124 of the first hub 112 is engaged with the recess portion 1142 of the driving member 114, the passive protrusion 1147 of the driving member 114 will be engaged with the open groove 141 of the linking tube 14 so as to drive the driving member 114 to rotate toward a direction indicated by an arrow A1. Then, the pushing member 1143 moves with respect to the abutting portion 1133 from the tilt portion 1145 to the horizontal portion 1146. Since the height of the abutting portion 1133 varies gradually during rotation, the brake arm 1132 of the brake member 113 is pushed toward the wheel 12, i.e. the brake arm 1132 moves toward the wheel 12. As shown in FIG. 8C, the brake arm 1132 passes through the hole 126 of the second hub 121 of the fixing seat 120 and then extends into the recess 131 of the brake hub 13 on the wheel 12, so as to achieve brake function. Since the recesses 131 are arranged compactly on the brake hub 13, no matter where the brake arm 1132 is pushed out, the brake arm 1132 can extend into one of the recesses 131 easily. Accordingly, the brake function will be more flexible.

It should be noted that the invention can further achieve synchronized brake function. Please refer to FIGS. 1 and 2 again. The axle 11 is inserted into a linking tube 14 and opposite ends of the linking tube 14 are connected to two brake fixing seats 100 respectively. In other words, the linking tube 14 connects two brake assemblies 101. When a user steps on one of the brake assemblies 101, the other one of the brake assemblies 101 will be actuated synchronously so as to achieve synchronized brake function. In this embodiment, at least one open groove 141 is formed on each of opposite ends of the linking tube 14. Since the structures of opposite ends of the linking tube 14 are the same, only one end is described in the following. As mentioned in the above, the active protrusions 1123a are formed in the central shaft 1123 and engaged with the open grooves 141 of the linking tube 14. Therefore, when the user steps on one of the pedals 111, the linking tube 14 will be driven to rotate and then the other pedal 111 and driving member 114 will rotate simultaneously, so as to drive the other brake assembly 110 to brake synchronously.

When the user wants to release the brake function, the user has to slightly step the pedal 111 toward a direction indicated by an arrow A2. Preferably, since the pushing member 1143 is resilient, the brake function can be released and the pedal can be recovered due to the elastic effect of the pushing member 1143 when the positioning rib 125a is disengaged from the groove 1148. However, the invention is not limited to the aforesaid embodiment. That is to say, even if the pushing member 1143 is not resilient, the user can tread the pedal 111 to the release position and then the linking tube 14 will drive the driving member 114 to rotate toward the direction indicated by the arrow A2 when the positioning rib 125b is engaged with the groove 1148. The tilt portion 1145 will contact the protruding arm 1134 during rotation so as to drive the brake arm 1132 of the brake member 113 away from the wheel 12. Consequently, the brake function is released.

FIGS. 9 to 14 illustrate a brake mechanism 1' according to a second embodiment of the invention.

Figure 9:
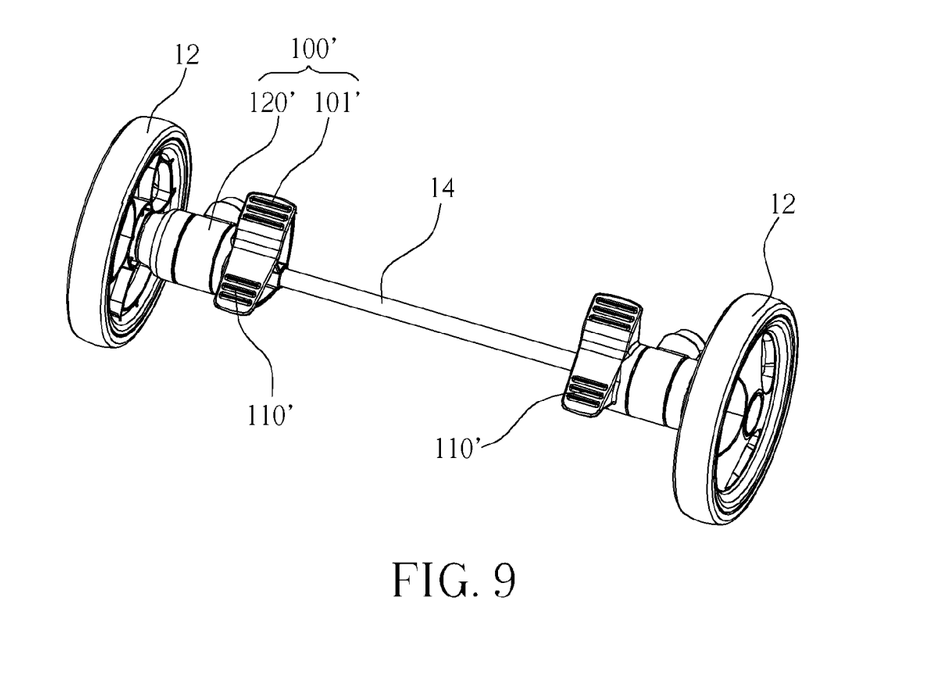
FIG. 9 is a perspective view illustrating a brake mechanism according to a second embodiment of the invention.
Figure 10A:
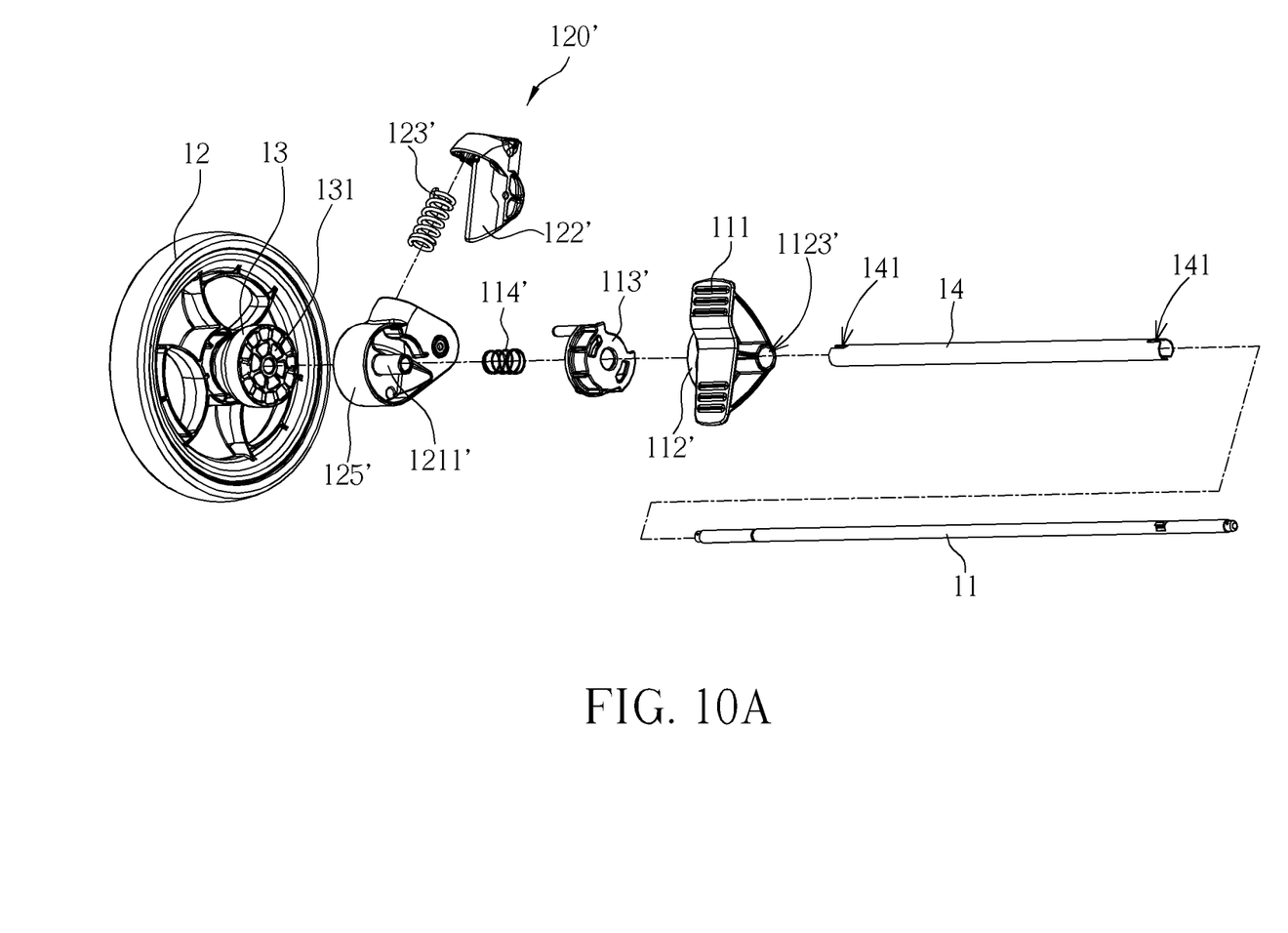
FIG. 10A is an exploded view illustrating parts of the brake mechanism shown in FIG. 9.
Figure 10B:
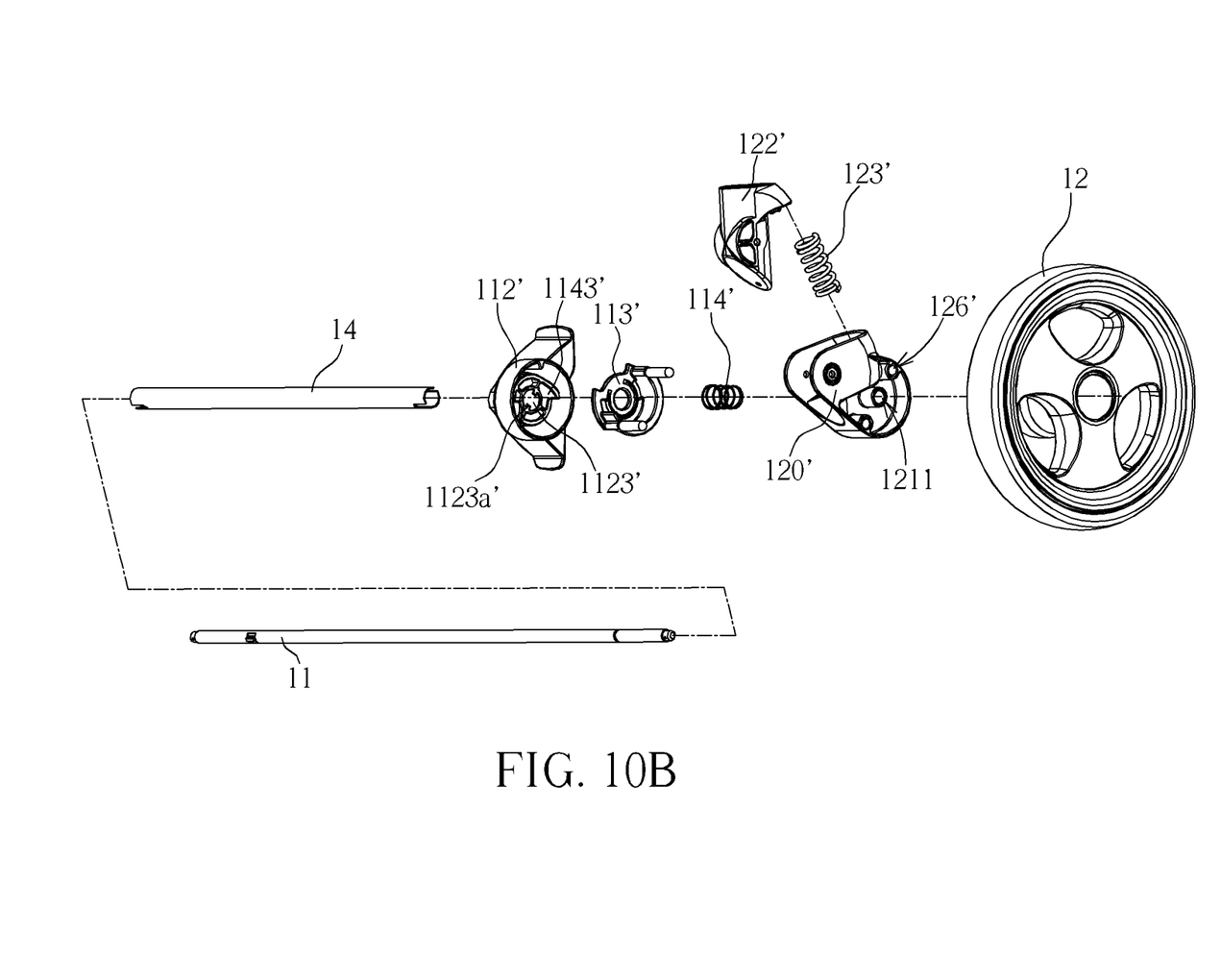
FIG. 10B is an exploded view illustrating parts of the brake mechanism shown in FIG. 9 in another view angle.
Figure 16:
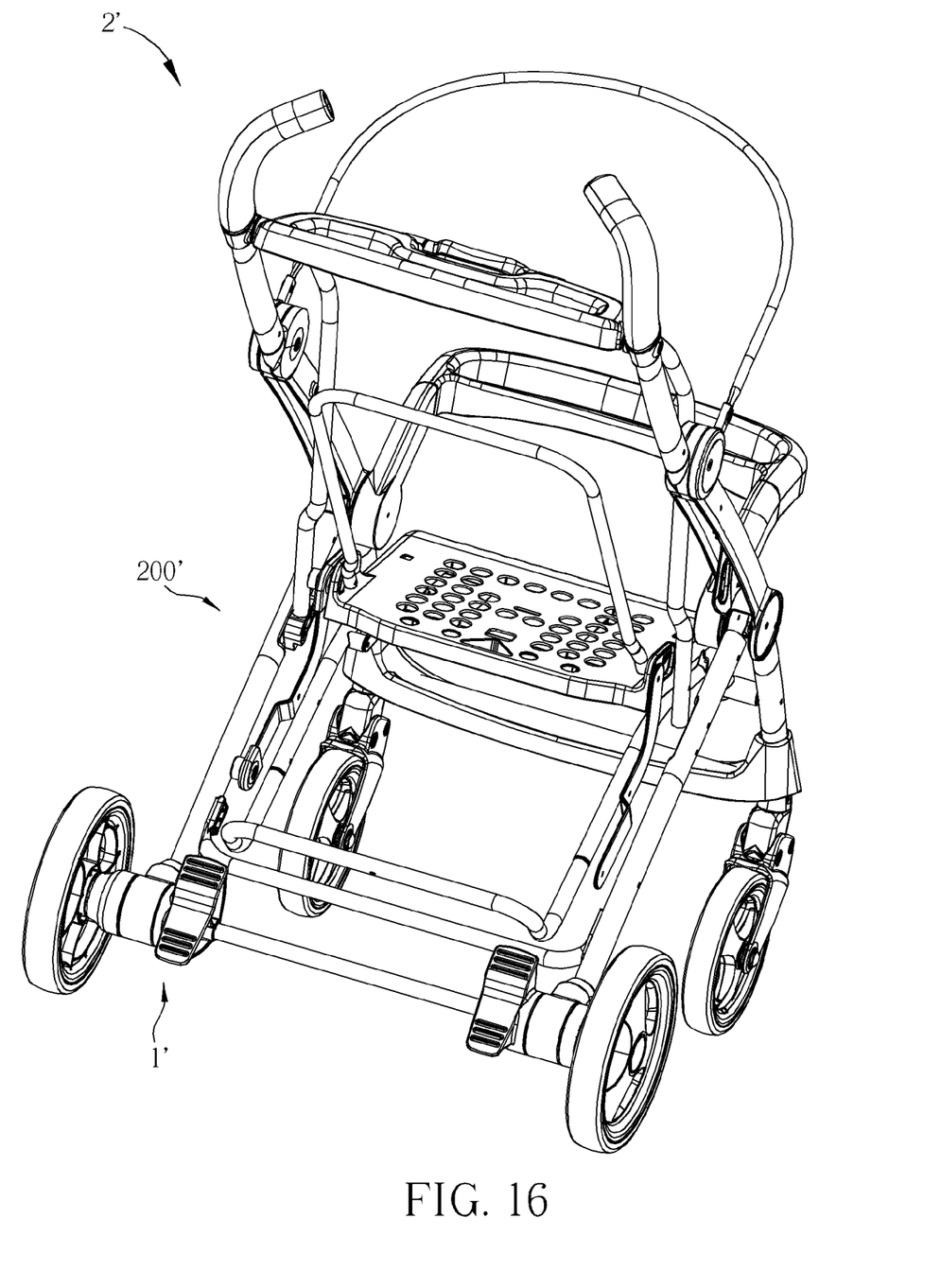
FIG. 16 is a perspective view illustrating a stroller according to another embodiment of the invention.

Referring to FIGS. 9, 10 and 16, as mentioned in the first embodiment, the brake mechanism 1' (shown in FIG. 16) of this embodiment comprises an axle 11, two wheels 12 and at least one brake fixing seat 100', wherein the brake fixing seat 100' is disposed at an inner side of the wheel 12 and on the axle 11. The brake fixing seat 100' comprises a brake assembly 101' and a fixing seat 120' connected to the brake assembly 101'. The main difference between the brake assembly 101' of this embodiment and the brake assembly 101 of the first embodiment is that the brake assembly 101' comprises a pedal assembly 110', a brake member 113' movably connected to the pedal assembly 110', and a spring 114' for releasing the brake function. The pedal assembly 110' comprises a pedal 111 and a first hub 112' connected to the pedal 111. The main difference between this embodiment and the first embodiment is the interaction between the brake member 113' and the first hub 112'.

Figure 11:
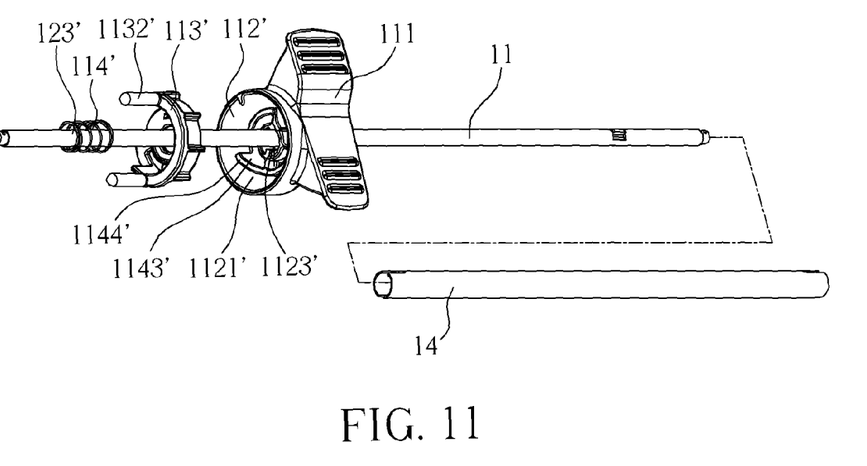
FIG. 11 is a schematic diagram illustrating the structure of parts of the brake assembly of the brake mechanism shown in FIG. 10.

In this embodiment, as shown in FIG. 11, the pushing member 1143' is disposed on the first bottom wall 1121' of the first hub 112' directly. In other words, the pushing member 1143' protrudes from the first bottom wall 1121' and is formed with the first hub 112' integrally. In this embodiment, the pushing member 1143' is formed as an oblique tooth structure, wherein the tooth structure extends toward the brake member 113' and the end of the tooth structure has a horizontal portion 1144'. Preferably, the invention comprises a pair of pushing member 1143'. Similarly, a central shaft 1123' is formed on a center of the first bottom wall 1121' and the axle 11 can pass through the central shaft 1123'. The pair of pushing members 1143' are disposed at a periphery of the central shaft 1123' symmetrically.

Figure 12:
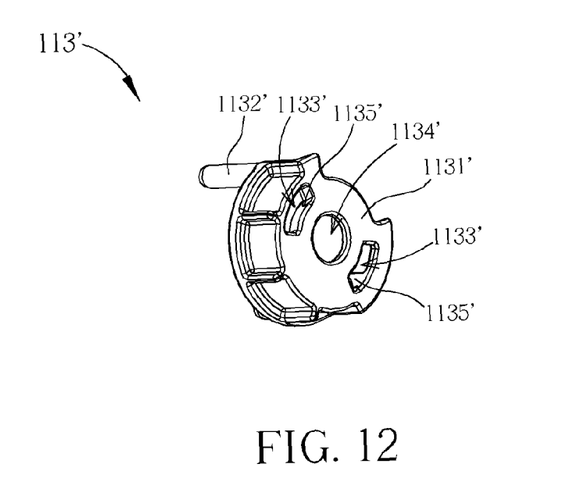
FIG. 12 is a schematic diagram illustrating the structure of the brake member of the brake mechanism shown in FIG. 10.

FIG. 12 illustrates the structure of the brake member 113' of this embodiment. The brake member 113' comprises an abutting portion 1131' with a central hole 1134' and a brake arm 1132' protrudes from the abutting portion 1131' vertically. Preferably, two slots 1133' are formed on the abutting portion 1131' and used to cooperate with the pushing members 1143'. Under release state, the pushing member 1143' of the first hub 112' is inserted into the slot 1133'. Under brake state, the pushing member 1143' pushes the abutting portion 1131' of the brake member 113' at the slot 1133' until the pushing member 1143' gets away from the slot 1133' and abuts against the abutting portion 1131' by the horizontal portion 1144', so as to push the brake arm 1132' into the recess 131 of the brake hub 13. Preferably, a guiding inclined surface 1135' is formed at an inner side of the slot 1133' and used to contact the pushing member 1143', such that the pushing member 1143' may push the brake member 113' much smoother.

Figure 13:
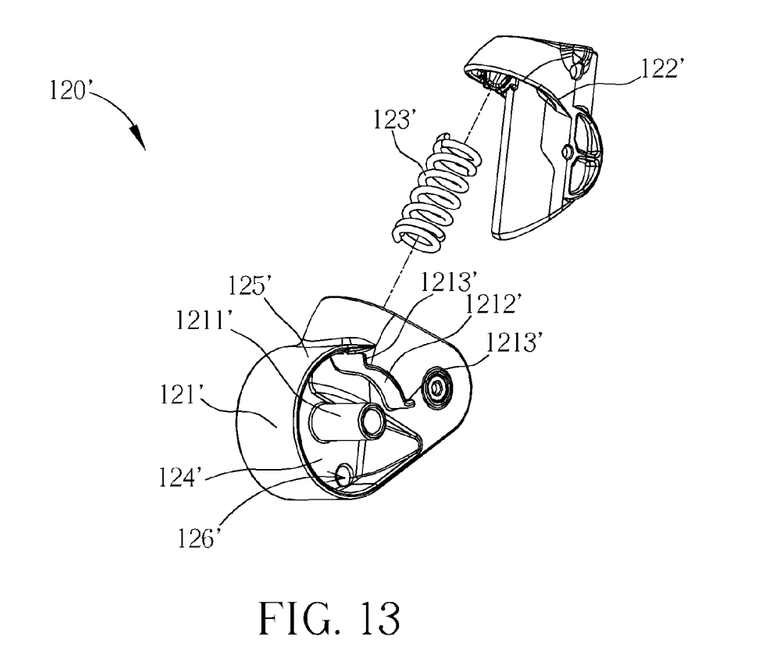
FIG. 13 is an exploded view illustrating the fixing seat of the brake mechanism shown in FIG. 10.

FIG. 13 is an exploded view illustrating the fixing seat 120' of the brake mechanism 1' of this embodiment. The fixing seat 120' comprises a second hub 121' disposed on the axle 11 and a first extending tube 122' connected to a frame of a stroller, wherein the first extending tube 122' is connected to the second hub 121' by a pivoting member, such as a rivet. A resilient member 123' is disposed between the first extending tube 122' and the second hub 121' and functions as a cushion. A sleeve 1211' is formed on a center of the second bottom wall 124' of the second hub 121' and a hole 126' is also formed on the second bottom wall 124' of the second hub 121', wherein the axle 11 can pass through the sleeve 1211' and the brake arm 1132' can pass through the hole 126'.

As mentioned in the above, the brake assembly 101' further comprises a spring 114' for releasing the brake function. In this embodiment, the spring 114' is disposed between the second hub 121' and the brake member 113'. Furthermore, one end of the spring 114' is disposed on the sleeve 1211' of the second hub 121' and the other end of the spring 114' abuts against the abutting portion 1131' of the brake member 113' from the opposite side of the pushing member 1143'.

When the first hub 112', the brake member 113', the spring 114' and the fixing seat 120' are assembled with each other, two pushing members 1143' of the first hub 112' abuts against the abutting portion 1131' of the brake member 113'. In a preferred embodiment, the two pushing members 1143' are engaged with two slots 1133' of the abutting portion 1131' and the brake arm 1132' extends into the hole 126' of the second hub 121'. When performing the brake function, the pedal 111 is trodden downwardly and then the first hub 112' rotates along with the pedal 111. At this time, the pushing member 1143' of the first hub 112' rotates within the slot 1133'. When the pushing member 1143' rotates and contacts the guiding inclined surface 1135' of the abutting portion 1131' of the brake member 113', the brake member 113' is pushed outwardly until the pushing member 1143' gets away from the slot 1133' and abuts against the abutting portion 1131' by the horizontal portion 1144'. At this time, the spring 114' is compressed by the brake member 113' and accommodated in the second hub 121' of the fixing seat 120'. When the brake arm 1132' of the brake member 113' extends into the hole 126', the brake arm 1132' will be inserted into the recess 131 of the brake hub 13 of the wheel 12, so as to achieve the brake function. When releasing the brake function, the pedal 111 is trodden and then the brake member 113' is pushed by the compressed spring 114'. Afterward, the brake arm 1132' gets away from the recess 131 of the brake hub 13 and the pushing member 1143' is engaged with the slot 1133' of the brake member 131' again, so as to release the brake function.

Figure 14:
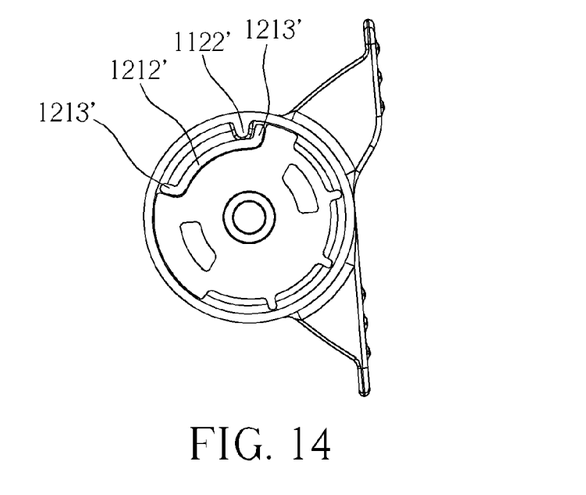
FIG. 14 is a schematic diagram illustrating the restraining plate and the restraining rib of the brake mechanism shown in FIG. 10.

In a preferred embodiment, the brake mechanism 1' can further limit the pedal to be trodden to a specific rotating range. As shown in FIGS. 13 and 14, the second hub 121' has a second side wall 125', a restraining plate 1212' is disposed on the second side wall 125', and two block portions 1213' are disposed on opposite ends of the restraining plate 1212'. The first hub 112' has a first side wall 1121' and a restraining rib 1122' is disposed on the first side wall 1121'. When the brake assembly 101' cooperates with the fixing seat 120', the restraining rib 1122' of the first hub 112' cooperates with the restraining plate 1212' of the second hub 121'. When the pedal 111 is trodden downwardly, the rotating range of the pedal 111 is limited between the two block portions 1213' of the restraining plate 1212'. Once the pedal 111 reaches one of the block portions 1213', the restraining rib 1122' cooperates with the block portions 1213' to restrain the pedal 111 rotating in limited range.

Similarly, as shown in FIG. 10B, by utilizing the linking tube 14 and the active protrusion 1123a' of the central shaft 1123' of the first hub 112', a user may tread any one of the pedals 111 to drive the other one to rotate, so as to operate the two brake mechanisms 1', which are located at opposite sides of the linking tube 14, to perform or release the brake function synchronously.

Figure 15:
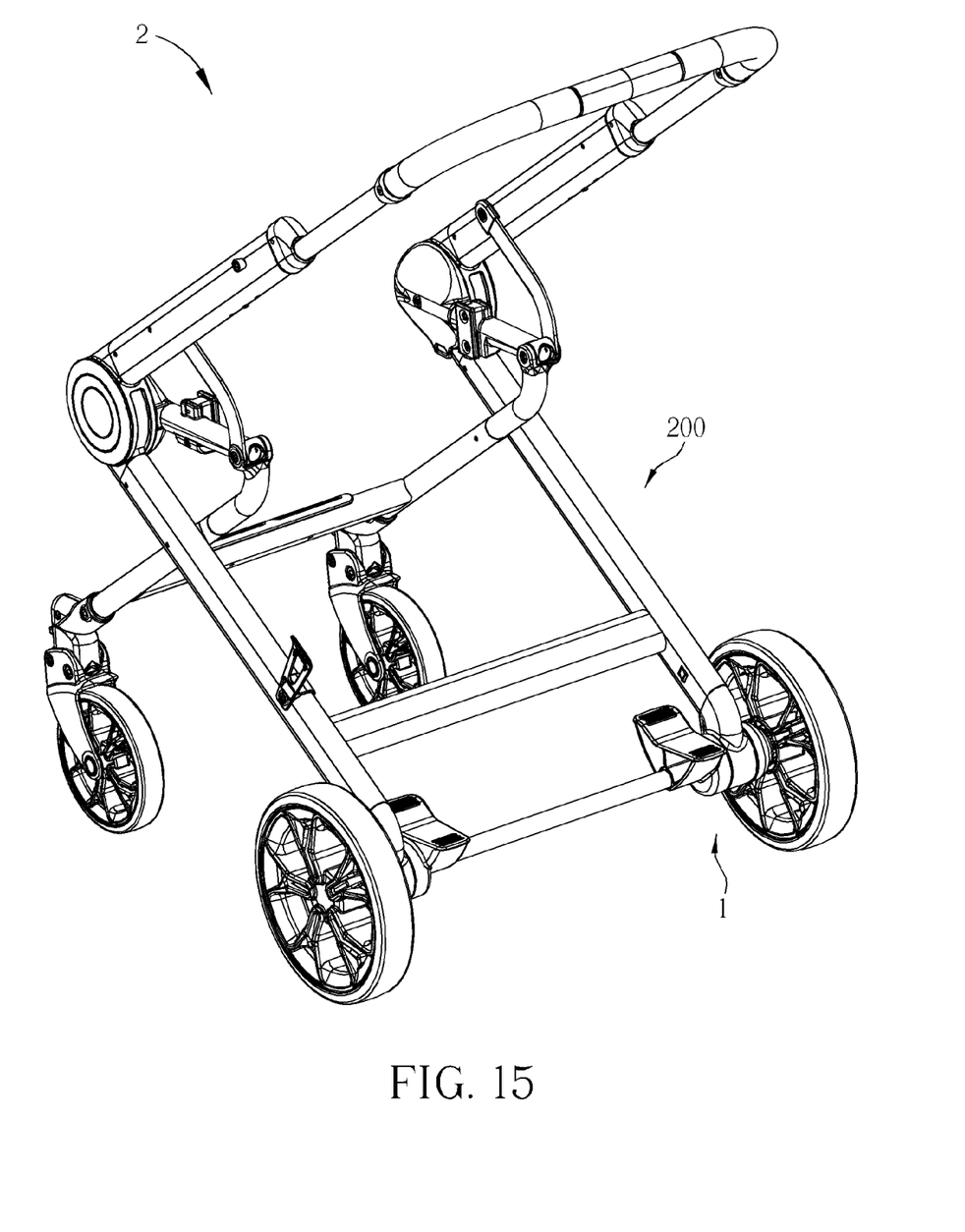
FIG. 15 is a perspective view illustrating a stroller according to one embodiment of the invention.

FIGS. 15 and 16 are perspective views illustrating two strollers of two embodiments of the invention respectively. The strollers 2, 2' comprise frames 200, 200' and brake mechanisms 1, 1' connected to the frames 200, 200' respectively. The brake mechanisms 1, 1' have been described in the above and can be applied to different frames of strollers.

Those skilled in the art will readily observe that numerous modifications and alterations of the device and method may be made while retaining the teachings of the invention.

What is claimed is:
1. A brake mechanism for a stroller comprising:
an axle;
a wheel; and
at least one brake fixing seat disposed at an inner side of the wheel, the brake fixing seat comprising a brake assembly and a fixing seat, the brake assembly comprising a pedal assembly and a brake member, the brake member having at least one abutting portion and at least one brake arm, the brake assembly further comprising a pushing member for pushing the abutting portion;

wherein a brake hub is disposed at the inner side of the wheel, a plurality of recesses is formed on the brake hub and is arranged compactly, the axle passes through the pedal assembly, the brake member and the fixing seat sequentially, the pedal assembly is used to drive the pushing member to push the abutting portion, such that the brake member moves toward the brake hub until the brake arm extends into the recesses, so as to brake the stroller.

2. The brake mechanism of claim 1, wherein the pedal assembly comprises a pedal and a first hub connected to the pedal, the brake member is movably disposed in the first hub.

3. The brake mechanism of claim 2, wherein the brake assembly further comprises a driving member disposed in the first hub, the driving member comprises a base plate with a shaft formed on a center of the base plate, at least one recess portion formed on a side of the base plate relative to the shaft, and the pushing member extending from the recess portion.

4. The brake mechanism of claim 3, wherein the pushing member is strip-shaped, the pushing member comprises a tilt portion and a horizontal portion, the tilt portion is connected to the recess portion, the horizontal portion is a free end of the pushing member, the horizontal portion and the base plate are separate.

5. The brake mechanism of claim 4, wherein the brake member comprises a central ring and two protruding arms protruding from opposite sides of the central ring, two brake arms are connected to the two protruding arms respectively, the abutting portion protrudes from a side of the brake arm.

6. The brake mechanism of claim 5, wherein the pushing member of the driving member is located between the abutting portion and the protruding arm, the tilt portion drives the brake member moves toward the wheel when the pedal drives the driving member to rotate, the brake arm extends into the recesses when the horizontal portion abuts against the abutting portion.

7. The brake mechanism of claim 4, wherein the pushing member is a resilient member.

8. The brake mechanism of claim 3, wherein the axle is disposed in a linking tube, at least one open groove is formed on each of opposite ends of the linking tube, at least one active protrusion is disposed in the first hub of the pedal assembly, the active protrusion is located in the open groove.

9. The brake mechanism of claim 8, wherein at least one passive protrusion is disposed on an outer wall of the shaft of the driving member, the passive protrusion is located in the open groove.

10. The brake mechanism of claim 3, wherein the first hub comprises a first bottom wall and a first side wall surrounding the first bottom wall, a central shaft is formed on a center of the first bottom wall, at least one protruding block is disposed on the first bottom wall, the protruding block is located in the recess portion of the driving member.

11. The brake mechanism of claim 10, wherein the fixing seat comprises a second hub disposed on the axle and a first extending tube connected to a frame of the stroller.

12. The brake mechanism of claim 11, wherein a resilient buckle is disposed on the first extending tube and is used to be detachably connected to the frame of the stroller.

13. The brake mechanism of claim 12, wherein the second hub comprises a second bottom wall and a second side wall surrounding the second bottom wall, a hole is formed on the second bottom wall and corresponding to the brake arm, the brake arm passes through the hole.

14. The brake mechanism of claim 13, wherein at least one positioning rib is disposed on the second side wall, at least one groove is formed on the recess portion of the driving member, the groove cooperates with the positioning rib to position the pedal on the fixing seat.

15. The brake mechanism of claim 14, wherein a restraining rib is disposed on the first side wall, a restraining plate is disposed on the second side wall, a block portion is disposed on each of opposite ends of the restraining plate, the block portion cooperates with the restraining rib to restrain the pedal to rotate with respect to the fixing seat within a specific range.

16. The brake mechanism of claim 2, wherein the pushing member is disposed in the first hub, the pushing member and the first hub are formed integrally.

17. The brake mechanism of claim 16, wherein a central hole is formed on the abutting portion of the brake member, the brake arm protrudes from the abutting portion vertically.

18. The brake mechanism of claim 17, wherein a slot is formed on the abutting portion, the pushing member passes through the slot and pushes the abutting portion.

19. The brake mechanism of claim 18, wherein an inner side of the slot has a guiding inclined surface, the guiding inclined surface contacts the pushing member so as to guide the brake member to move toward the brake hub.

20. The brake mechanism of claim 18, wherein the brake assembly further comprises a spring, one end of the spring abuts against the fixing seat and another end of the spring abuts against the abutting portion.

21. A stroller comprising at lest one brake mechanism, the brake mechanism comprising:
an axle;
a wheel; and
at least one brake fixing seat disposed at an inner side of the wheel, the brake fixing seat comprising a brake assembly and a fixing seat, the brake assembly comprising a pedal assembly and a brake member, the brake member having at least one abutting portion and at least one brake arm, the brake assembly further comprising a pushing member for pushing the abutting portion;
wherein a brake hub is disposed at the inner side of the wheel, a plurality of recesses is formed on the brake hub and is arranged compactly, the axle passes through the pedal assembly, the brake member and the fixing seat sequentially, the pedal assembly is used to drive the pushing member to push the abutting portion, such that the brake member moves toward the brake hub until the brake arm extends into the recesses, so as to brake the stroller.

22. The brake mechanism of claim 21, comprising a first brake mechanism, a second brake mechanism and a linking tube, the axle being disposed in the linking tube, the linking tube connecting two pedal assemblies, when the pedal assembly of the first brake mechanism rotates, the linking tube drives the pedal assembly of the second brake mechanism to rotate, so as to operate the first and second brake mechanisms synchronously.

* * * * *